United States Patent

[11] 3,576,379

| [72] | Inventor | James A. Parise<br>1145 Sharlene Drive, Youngstown, Ohio 44511 |
|---|---|---|
| [21] | Appl. No. | 794,279 |
| [22] | Filed | Jan. 27, 1969 |
| [45] | Patented | Apr. 27, 1971 |

[54] PORTABLE LOW-PRESSURE DIRECT CURRENT PUMP
1 Claim, 4 Drawing Figs.

| [52] | U.S. Cl. | 417/410 |
|---|---|---|
| [51] | Int. Cl. | F04c 15/00 |
| [50] | Field of Search | 103/118, 126 (M), 126 (D); 173/169, 170; 230/139; 417/410, 355 |

[56] References Cited
UNITED STATES PATENTS

| 2,619,039 | 11/1952 | Maisch | 103/118X |
| 2,635,550 | 4/1953 | Granberg | 103/118 |
| 2,865,618 | 12/1958 | Abell | 103/6X |
| 2,880,676 | 4/1959 | Succop | 103/118 |
| 2,925,604 | 2/1960 | Kopf et al. | 173/170 |
| 3,139,834 | 7/1964 | Blomgreen et al. | 103/126 |

*Primary Examiner*—Robert M. Walker
*Attorney*—Browdy and Neimark

ABSTRACT: A pump is provided to meet low-capacity demand of water, and of easy portability, for operating on direct current voltage generated by automobiles and trucks. The pump is a gear pump, is easily fabricated and is of small size and light weight.

PATENTED APR 27 1971 3,576,379

INVENTOR
JAMES PARISE

BY Browdy and Neimark
ATTORNEYS

INVENTOR
JAMES PARISE

PORTABLE LOW-PRESSURE DIRECT CURRENT PUMP

The present invention relates to a low-capacity liquid gear pump and, more particularly, to a small, lightweight handholdable, portable 12-volt DC pump having a switch closely adjacent the handle, and a cord which may be attached to a direct current electric power source in an automobile or truck.

A need presently exists for a very low weight, e.g., 12 pounds or less, low-pressure, portable pump to meet low-capacity [low gallons per minute] demand of water or similar liquid of like viscosity, and for ease of portability to be carried in an automobile or truck and which may be operated on the low voltage direct current generated by an automobile battery.

Other attempts to provide a pump for carrying out the objectives of the present invention have resulted in constructions of excessive size and/or weight and have been undesirable in this regard. Others have used impeller-type pumps or diaphragm pumps, but these constructions have not proven adequate; and others have provided complicated high-pressure pumps. Now, in accordance with the present invention, it has been found that a gear pump of specific construction utilizing a direct current electric motor preferably of at least 5,000 r.p.m., with suitable gearing, has provided a satisfactory construction.

It is, accordingly, an object of the present invention to overcome the deficiencies of the prior art, such as indicated above.

It is another object of the present invention to pump a low-viscosity liquid, such as cold water, where needed in the vicinity of an automobile or truck.

It is another object of the present invention to provide a low-pressure, hand-holdable portable gear pump for the pumping of water or other low-viscosity liquids and driven by a direct current electric motor.

It is another object of the present invention to provide a low-capacity liquid gear pump, which is small, light in weight and portable, yet which operates directly from a 12-volt DC motor operating at greater than 5,000 r.p.m.

These and other objects and the nature and advantages of the instant invention will be more apparent from the following detailed description taken in conjunction with the drawing, wherein.

Figure 1:
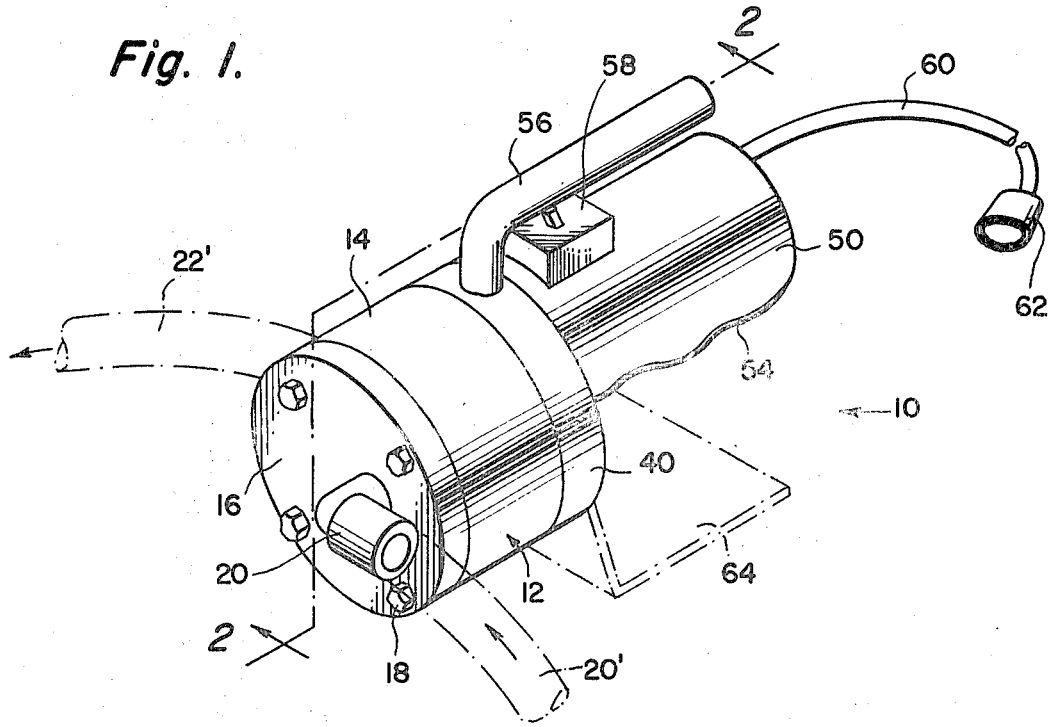
FIG. 1 is a perspective view of a pump, partly in phantom, in accordance with the present invention.

A small, low-pressure, low-capacity, portable gear pump for the pumping of water or other low-viscosity liquid is shown generally at 10 in FIG. 1. The pump 10 has a generally cylindrical outer wall pump housing 12 having a generally horizontal axis and formed of a cuplike member 14 and a pump cap 16 for closing the open end of the cuplike member 14, such as by the use of bolts or screws 18. While the pump housing may be formed of any suitable material which is noncorrosive, such as brass, bronze or hard rubber, it is preferred to use a suitable plastic material such as polyolefin or nylon due to the light weight and low cost of such plastic materials; in addition, the tolerances in these materials can be kept very close, in the present case the tolerance being as close as 0.0008 inch.

Figure 3:
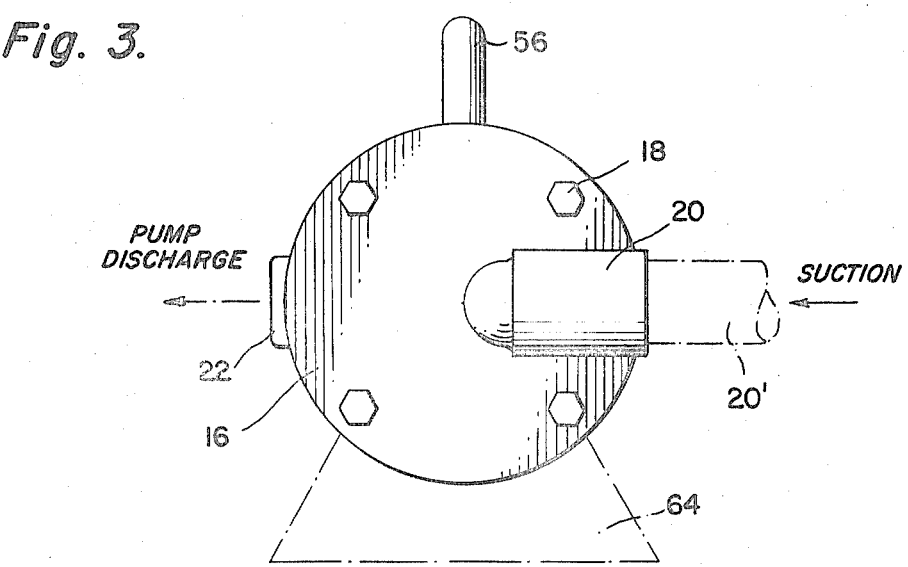
FIG. 3 is a front elevation.

A liquid inlet 20 to the interior of the housing 12 is provided in the pump cap 16 and generally along the axis of the housing 12, although as seen from FIG. 3 the entrance is slightly offset from such axis. A liquid outlet 22 from the interior of the housing 12 is provided along the periphery of such housing. The outlet 22 may be provided with internal threads for the attachment of a suitable pipe or hose such as the hose 22' shown in phantom in FIG. 1. Similarly, the inlet 20 may be provided with a hose or pipe 20'.

Figure 4:
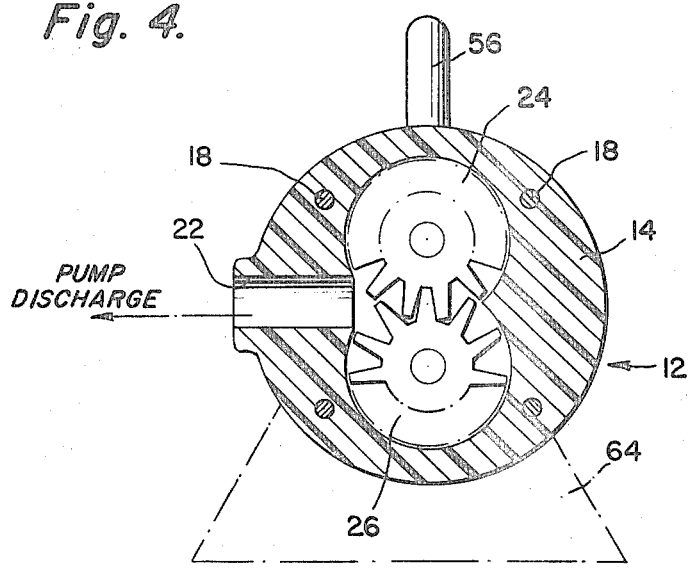
FIG. 4 is a section taken along line 4—4 of FIG. 2.

Disposed within the interior of the housing 12 is a pair of adjacent interengaging plastic pumping gear wheels 24 and 26 which are in interconnecting driving relationship. As can been seen, the axes of these gear wheels 24 and 26 are parallel to the axis of the housing 12. As can best be seen in FIG. 4, the cuplike member 14 of the pump housing 12 preferably has an internal configuration which is not cylindrical, but is complementary to the configuration of the pumping gears 24 and 26. As with the housing, the gears are preferably formed of plastic, most preferably nylon, although any noncorrosive material can be used.

In the preferred embodiment of the present invention, a drive housing 40 is mounted behind the pump housing 12, the drive housing being mounted directly to the back of the pump housing 12 by suitable screws or bolts 42. The drive housing may be formed of any suitable material such as a corrosive-resistant metal casting of brass, bronze or nonmetallic material. In some instances upon proper selection of the driving motor, discussed below, it is possible to eliminate the drive housing and its contents and use a direct drive from the motor to the pumping gears 24 and 26.

In the preferred embodiment, however, a pump shaft 28 is mounted along the axis of the pumping gear 26 and projects through the backwall of the cuplike member 14 of the pump housing 12 and into the drive housing 40. The shaft 28 and gear 26 are preferably formed of one piece, but if two pieces, the shaft 28 is press fitted to the gear 26. In either event, the shaft 28 rotates freely in the housing 12; a suitable seal bearing 30 may be provided to decrease wear of the rotating shaft 28 against the pump housing 12, while yet preventing leakage of liquid from the pump housing 12 to the drive housing 40.

The pumping gear 24, on the other hand, is provided with a stationary shaft 32 which is merely a projection of the backwall of the cuplike member 14 of the housing 12. The pump gear 24 is free to rotate on the shaft 32, and there will be little or no wear if either the gear 24, the shaft 32, or both, are formed of nylon, or are coated with nylon or a self-lubricating plastic such as Teflon or the like.

Figure 2:
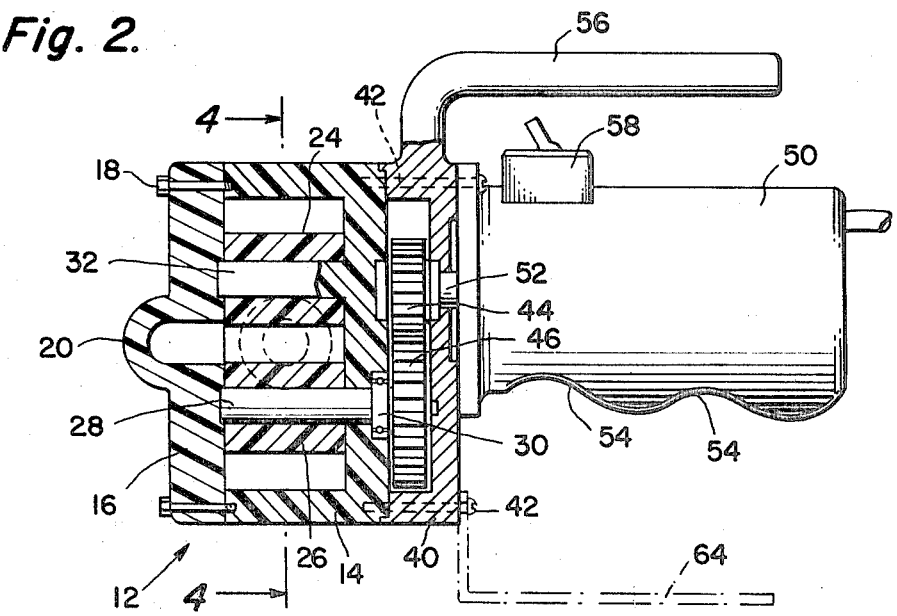
FIG. 2 is a section taken along the line 2—2 of FIG. 1.

Mounted behind the drive housing 40 such as by the upper bolts 42 as shown in FIG. 2 is a low-voltage, direct current electric motor 50. The motor is preferably a 12-volt direct current motor which can be powered by the 12-volt battery of an automobile or truck. Usually, 12-volt direct current motors of the small size contemplated have a speed on the order of 5,000 r.p.m. Where slower motors on the order of 2,500 r.p.m. are available for use, the gear housing 40 and its contents may be eliminated, but for 5,000 r.p.m. motors such a housing and contents are necessary.

The pump 50 is provided with a motor shaft 52 which passes through the backwall of the drive housing 40 and into the interior of such drive housing. A first driving gear 44 is mounted on motor shaft 52 within the drive housing. A second driving gear 46, mounted on the end of the pump shaft 28 projecting into the gear housing 40 is located adjacent the first driving gear 44 within the housing 40 and in driving interengaging relationship with the first driving gear 44. This provides a drive chain through the motor shaft 52, the driving gear 44, the driving gear 46, pump shaft 28, the pump gear 26 and the pump gear 24. As indicated above, where a direct current motor 50 of speed on the order of 2,500 r.p.m. is available in a sufficiently small size, the motor shaft 52 may be mounted directly on one of the gear wheels 24,26, with the consequent elimination of the driving gears 44,46, or the motor shaft 52 will drive the pump shaft 28.

The size of the pump construction in accordance with the present invention is a very important aspect of the invention. Thus, the motor 50 has a diameter of about 1¼ to 1¾ inches, and the pump housing 12 has a diameter of about 2 to 3 inches. Accordingly, because of the small size of the pump 10, the motor housing may be provided with finger grips 54 in which case the motor casing itself comprises a handle for the pump 10. Alternatively, a separate handle 56 may be provided which comprises a rod connected to the gear housing 40 and projecting upwardly and backwardly over the motor 50. In either event, it is preferred to mount an external switch 58 for the motor 50 on the top of the motor casing, and where the separate handle 56 is provided such switch 58 will be directly therebeneath. In either event, the pump 10 may be grasped in the hand and the switch 58 operated with one of the fingers.

The DC electric motor 50 is provided with a suitable cord 60 through which electric power reaches such motor from the battery of a car or truck. The cord 60 is provided at its terminal end with suitable means for attachment to the direct current battery, such as clips for attachment directly to the battery, or preferably a cigarette-type lighter plug 62 for plugging into the cigarette lighter of an automobile.

The motor is also optionally provided with a stand 64 shown in phantom in the drawing, and such a stand may be connected directly to the gear housing by means of the lower bolts or screws 42 as shown in FIG. 2.

As indicated above, the electric motor 50 is preferably a 12-volt DC motor wherein the shaft moves at a rate of about 5,000 r.p.m. In this case, the gear ratio of driving gear 44 to driving gear 46 is about 1:2, i.e., driving gear 46 is twice the size of driving gear 44 so that pump shaft 28 moves at about half the rate as motor shaft 52. Of course, if a motor having a shaft speed of about 2,500 r.p.m. is used, the gears 44 and 46 may be eliminated as indicated above.

The foregoing description of the specific embodiment will so fully reveal the general nature of the invention that others can, by applying current knowledge, readily modify such specific embodiment and/or adapt it for various applications without departing from the generic concept and, therefore, such adaptations and modifications should and are intended to be comprehended within the meaning and range of equivalents of the claimed subject matter.

I claim:

1. A small, low-pressure, portable gear pump, weighing about 12 pounds or less, for the pumping of water or other low-viscosity liquid, comprising:

a generally cylindrical pump housing having a horizontal axis, said pump housing being formed of plastic;

a liquid inlet to the interior of said housing along the axis thereof and a liquid outlet from the interior of said housing along the periphery thereof;

a pair of adjacent interengaging plastic pumping gear wheels within said pump housing and in interconnecting driving relationship, the axes of said gear wheels being parallel to the axis of said housing, said pumping gear wheels being adapted to rotate at a high speed on the order of 2,500 r.p.m.;

a drive housing mounted behind said pump housing, and a pump shaft mounted to one of said pumping gear wheels and passing through the backwall of said pump housing into said drive housing;

means to rotate said pumping gear wheels at about 2,500 r.p.m. including a 12-volt, direct current, high-speed electric motor mounted behind said drive housing and having a motor shaft passing through the backwall of said drive housing;

means for drivedly interconnecting said motor shaft and said pump shaft;

a handle projecting backwardly from said gear housing;

an external switch mounted on said motor operable as said handle is gripped in the hand; and an electric cord for providing electric power to said motor from a source of electric power, and means on the end of said cord for attachment to an automobile battery;

wherein said means for drivedly interconnecting said motor shaft and said pump shaft comprises a first driving gear coaxial with one of said pumping gears and mounted on said motor shaft within said drive housing and a second driving gear adjacent said first driving gear within said drive housing and in driving interengaging relationship with said first driving gear, said second driving gear being mounted on said pump shaft for direct interconnection with said one pumping gear wheel mounted on said pump shaft;

said pump housing comprising a cuplike member having an internal configuration complementary to said pumping gear and a pump cap carrying said inlet for closing the open end of said cuplike member;

said means for attachment to an automobile battery comprising a cigarette-type lighter plug for plugging into the lighter of an automobile;

said handle comprising the casing for said motor, said casing being provided along its bottom with finger grips; and a stand for said gear pump mounted to said gear housing.